United States Patent
Taleb et al.

(10) Patent No.: US 9,299,359 B2
(45) Date of Patent: Mar. 29, 2016

(54) METHOD AND AN APPARATUS FOR VOICE QUALITY ENHANCEMENT (VQE) FOR DETECTION OF VQE IN A RECEIVING SIGNAL USING A GUASSIAN MIXTURE MODEL

(71) Applicant: Huawei Technologies Co., Ltd., Shenzhen, Guangdong (CN)

(72) Inventors: Anisse Taleb, Stockholm (SE); David Virette, Shenzhen (CN); Jianfeng Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 130 days.

(21) Appl. No.: 13/940,494

(22) Filed: Jul. 12, 2013

(65) Prior Publication Data

US 2013/0304461 A1    Nov. 14, 2013

Related U.S. Application Data

(63) Continuation of application No. PCT/CN2011/070288, filed on Jan. 14, 2011.

(51) Int. Cl.
*G10L 21/00* (2013.01)
*H04M 3/00* (2006.01)
(Continued)

(52) U.S. Cl.
CPC ............. *G10L 21/0208* (2013.01); *G10L 21/02* (2013.01); *G10L 25/69* (2013.01); *H04Q 3/00* (2013.01)

(58) Field of Classification Search
CPC .............................. G10L 21/0208; H04Q 3/00
USPC ................................... 704/225, 226; 379/257
See application file for complete search history.

(56) References Cited

U.S. PATENT DOCUMENTS

| | | | |
|---|---|---|---|
| 6,490,552 | B1 | 12/2002 | Lee et al. |
| 2001/0038700 | A1 | 11/2001 | Maejima |

(Continued)

FOREIGN PATENT DOCUMENTS

| | | |
|---|---|---|
| CN | 1313674 A | 9/2001 |
| CN | 1504042 A | 6/2004 |

(Continued)

OTHER PUBLICATIONS

International Search Report in corresponding PCT Patent Application No. PCT/CN2011/070288 (Oct. 27, 2011).

(Continued)

*Primary Examiner* — Farzad Kazeminezhad
(74) *Attorney, Agent, or Firm* — Leydig, Voit & Mayer, Ltd.

(57) ABSTRACT

A voice quality enhancement (VQE) detector for a network element receiving an audio signal from a previous network element of a network, wherein said voice quality enhancement detector is adapted: to perform a voice quality enhancement detection based on the received audio signal, wherein said voice quality enhancement detection comprises detecting that at least one voice quality enhancement function, VQEE comprising of a noise cancellation or an echo cancellation function using a Gaussian Mixture Model was applied to the received audio signal by at least one previous network element of the network; and to control a voice quality enhancement processing of the received audio signal depending on the detection result.

20 Claims, 2 Drawing Sheets

(51) Int. Cl.
  *G10L 21/0208* (2013.01)
  *G10L 21/02* (2013.01)
  *H04Q 3/00* (2006.01)
  *G10L 25/69* (2013.01)

(56) References Cited

U.S. PATENT DOCUMENTS

| | | |
|---|---|---|
| 2003/0097256 A1 | 5/2003 | Kleijn |
| 2004/0076271 A1 | 4/2004 | Koistinen et al. |
| 2004/0243404 A1* | 12/2004 | Cezanne et al. ............ 704/225 |
| 2005/0129224 A1* | 6/2005 | Piket et al. ............ H04M 9/082 379/406.01 |
| 2006/0187851 A1* | 8/2006 | Waldorf et al. ............ 370/252 |
| 2007/0081657 A1* | 4/2007 | Turner ............ 379/257 |
| 2007/0104114 A1 | 5/2007 | Chu et al. |
| 2008/0240079 A1 | 10/2008 | Chu et al. |
| 2008/0261586 A1 | 10/2008 | Joensuu |
| 2009/0161882 A1 | 6/2009 | Le Faucher et al. |
| 2009/0287480 A1 | 11/2009 | Mapes-Riordan et al. |
| 2009/0306971 A1 | 12/2009 | Kim et al. |

FOREIGN PATENT DOCUMENTS

| | | |
|---|---|---|
| CN | 1608285 A | 4/2005 |
| CN | 1877988 A | 12/2006 |
| CN | 101313484 A | 11/2008 |
| WO | WO 0215395 A1 | 2/2002 |

OTHER PUBLICATIONS

"Mechanism for dynamic coordination of signal processing functions," *Series G: Transmission Systems and Media, Digital Systems and Networks: Digital terminal equipments—Other terminal equipment*, G.799.2, ITU (Dec. 2009).

Ding et al., "Non-intrusive single-ended speech quality assessment in VoIP," *Speech Communication*, pp. 477-489, Issue 49, Elsevier B.V. (2007).

* cited by examiner

METHOD AND AN APPARATUS FOR VOICE QUALITY ENHANCEMENT (VQE) FOR DETECTION OF VQE IN A RECEIVING SIGNAL USING A GUASSIAN MIXTURE MODEL

CROSS-REFERENCE TO RELATED APPLICATIONS

This application is a continuation of International Patent Application No. PCT/CN2011/070288, filed on Jan. 14, 2011, which is hereby incorporated by reference in its entirety.

FIELD OF THE INVENTION

The invention relates to a method and apparatus for detecting and processing a voice quality enhancement (VQE) in a network and in particular a voice quality enhancement VQE detector for a network element and a method for controlling a voice quality enhancement VQE provided by a voice quality enhancement (VQE) device (VED).

BACKGROUND OF THE INVENTION

In a telecommunication system voice quality enhancement VQE is required if a quality of the voice signal is degraded. An acoustic echo, a background noise or reverberations can form some of the possible causes for the signal degradation of the voice signal transported in a communication network. The voice quality enhancement VQE can be either applied in a terminal or in an intermediate network node of the communication network or both. Voice quality enhancement can significantly improve the quality of conversations by removing echo and background noise as well as by adjusting speech levels to achieve a consistent and comfortable listening experience to the users.

When voice quality enhancement VQE is applied in the telecommunication network this can be done by voice enhancement devices VED as specified for instance in ITU-TG.160. A voice enhancement device VED can provide certain signal processing network functions SPNFs such as noise reduction and acoustic echo cancellation in the digital transmission path of the communication network wherein said functions can perform voice quality enhancement functions on voiceband signals that can traverse the telecommunication network. The network can be a wired and/or wireless communication network.

In general, terminals of the communication network such as mobile phones can contain voice quality enhancement VQE models such as models for a noise reduction and acoustic echo cancellation. Acoustic echo cancellation models only operate on the digitally sampled audio signals of a communication device or a terminal. An acoustic echo cancellation model uses a transfer function of the acoustic environment from a loudspeaker to the microphone of the communication device which is estimated to cancel the received echo signals from the microphone signal. An acoustic echo cancellation model forms an essential part for providing a voice quality enhancement VQE function to any form of voice communication device of a network. Furthermore, a noise reduction module can adaptively reduce a background noise and effectively increase a SNR of the speech signal. In an acoustic environment there can be many sources of noise consisting of different spectrum characteristics, being either time invariant or time variant. Noise reduction provided by a noise reduction module has to be robust to all types of noise. Further, in conventional networks there are still many poorly designed terminals such as mobile phones which leave a high level of degradation of the voice signal. A poor design of the terminal can both come from a poorly designed acoustic interface as well as the use of poorly performing voice quality enhancement functions provided by the VQE modules. This leads to an overall poor conversation quality and promotes a need for network voice quality enhancement functions (VQEF) provided by a network elements of the communication network transporting the voice signal from one terminal to another terminal. A voice quality enhancement function provided by a network element can for instance compensate for residual acoustic echo from a mobile terminal of a user and can also perform additional noise reduction. Accordingly, conventional communication networks have as a common functionality voice quality enhancement functions (VQEF) provided by network elements of the communication network. This VQE-function can form a crucial function of the communication network and is a feature of the conversation quality offered by the respective network operator to the customers.

Audio signal processing in general and in particular voice quality enhancement (VQE) signal processing is to be performed as close as possible to the acoustic front end, i.e. the terminals to secure a high quality communication from the user's point of view. Voice quality enhancement functions can be better applied in a terminal since the audio signal can be encoded, modulated and transmitted over an unreliable communication channel such as a radio link which adds distortions to the transmitted signal such as a non-linearity and coding noise which reduces the performance of voice quality enhancement functions (VQEF) in particular of model based voice quality enhancements (VQE) processing in the network. On the other hand, an implementation of signal processing functions in a communication network is common in cases when no such capability is possible in the respective terminals, for example in a PSDN phone or if the capability offered in the terminal is of low performance. Accordingly, in conventional communication networks, "tandeming cases" can occur wherein to a speech signal a voice quality enhancement function (VQEF) is applied twice or more, i.e. both in the terminal as well as in at least one network element of the communication network. Tandeming of this type of non-linear and time-variant signal processing functions is not beneficial for the overall speech quality as perceived by the users. In most cases the speech signal is degraded due to this tandemed signal processing. Typical examples are degraded speech in uplink connections due to tandemed noise cancellation or poor double talk performance due to tandemed echo cancellation. Further severe artifacts such as clipping can be introduced into the processed speech signal which can lead to even more perceivable quality degradations for the users.

In ITU-T G.799.2 "Mechanism for Dynamic Coordination for Signal Processing Function" ITU-T SG16 a mechanism has been recently defined for implementation in terminals and network elements which can form a basis for a control of signal processing functions across terminals and network elements of a communication network. This conventional mechanism consists of adding a signaling in the communication network to inform whether voice quality enhancement VQE functions have been already applied to the signal. An appropriate protocol for wired and optical networks which is intended to implement this signaling mechanism is developed in ITU-T SG.11. A similar type of protocol is necessary for mobile communication networks. An overall quality perception increase of the users can be achieved when this conventional signaling mechanism is supported by mobile phones and mobile network elements. Signal processing functions not needed in a connection are switched off. The issue for which this signaling is provided is that the network does not know currently when the respective terminal exploits its signal processing capability. Hence, this conventional mechanism to avoid a voice quality enhancement VQE tandem fails or is missing if the signaling is not used.

The introduction of a signaling which makes the network elements of the communication network aware of a presence or absence of a signal processing capability of a voice quality enhancement device (VED) in the terminal has still many drawbacks. By introducing such a signaling all network elements of the communication network have to be aware of how to signal and how to interpret the received signaling in order to obtain an efficient processing. If an additional terminal employing this signaling is introduced a legacy voice enhancement device cannot interpret this signaling. Therefore, the introduction of such a signaling requires to update all existing voice enhancement devices VEDs of the network elements so that the voice enhancement devices are capable of interpreting this signaling. Accordingly, the implementation of such a control mechanism in existing communication networks requires high costs and efforts. In addition, any signaling mechanism and protocols has to be standardized first, especially given that communication networks consist o Accordingly, it is a goal of the present invention to provide an improved apparatus and an improved method for providing voice quality enhancement VQE allowing, for example, to avoid a VQE tandem or VQE double processing.

SUMMARY OF THE INVENTION

The invention provides according to a first aspect a voice quality enhancement (VQE) detector for a network element receiving an audio signal from a previous network element of the network, wherein said voice quality enhancement (VQE) detector is adapted: to perform a voice quality enhancement detection based on the received audio signal, wherein said voice quality enhancement detection comprises detecting that at least one voice quality enhancement function, VQEF, was applied to the received audio signal by at least one previous network element of the network; and to control a voice quality enhancement processing of the received audio signal depending on the detection result.

The previous network elements can comprise one or several network elements within a communication chain or network path connecting two terminals with each other. The network elements can comprise terminals or intermediate network nodes of the network. Accordingly, the term previous network element refers to any network element of the network, which is with regard to the network path the audio signal is sent through the network, previous to the current or actual network element of the network performing the voice quality enhancement detection.

The voice quality enhancement function (VQEF) applied to the received audio signal by the at least one previous network element of the network may have been applied to the audio signal by the previous network element from which the actual network element directly received the audio signal or by any earlier network element of the network with regard to the network path of the audio signal.

The voice quality enhancement (VQE) detector according to the first aspect of the present invention does not rely on a control signaling being carried over to the network elements of the network but instead performs its own detection whether a voice quality enhancement function VQEF has been applied to the audio signal. The voice quality enhancement (VQE) detector for a network element according to the first aspect of the present invention can detect if a voice quality enhancement function (VQEF) has already been performed on the received audio signal previously or prior to receiving the audio signal, and optionally also which voice quality enhancement function (VQEF) has already been performed on the received audio signal previously or prior to receiving the audio signal, to avoid that, for example, the same voice quality enhancement function (VQEF) is performed more than once in the network elements and/or in the terminals of the network so that a degradation of the speech signal can be avoided.

The voice quality enhancement (VQE) detector for a network element according to the first aspect of the present invention can be provided in any network element of a communication chain within a communication network. In particular, the voice quality enhancement (VQE) detector for a network element can be provided in a network terminal or in an intermediate network node of a communication network.

In a possible implementation of the voice quality enhancement (VQE) detector according to the first aspect of the present invention said voice quality enhancement detection comprises detecting at least one specific voice quality enhancement function, VQEF, which was applied to the received audio signal by the at least one previous network element.

In a possible implementation of the voice quality enhancement (VQE) detector according to the first aspect of the present invention the at least one voice quality enhancement VQE-function (VQEF) is a noise reduction function and/or an echo cancellation function. Other voice quality enhancement (VQE) functions are also possible, such as dynamic range compression functions and/or automatic gain control functions.

In a possible implementation of the voice quality enhancement (VQE) detector according to the first aspect of the present invention said received audio signal is a coded audio signal, and the voice quality enhancement (VQE) detector is connected to a signal input and processes a bit stream of the coded audio signal received at the signal input to said voice quality enhancement detection.

In a possible implementation of the voice quality enhancement (VQE) detector according to the first aspect of the present invention said voice quality enhancement (VQE) detector is connected to an output of a bit stream decoder and processes a decoder signal generated by said bit stream decoder based on the received coded audio signal to perform said voice quality enhancement detection.

Accordingly, the voice quality enhancement (VQE) detector can either operate in the signal domain, i.e. on the decoded speech signal, or in the encoded domain on the bit stream of the received encoded audio signal.

In a possible implementation of the voice quality enhancement (VQE) detector according to the first aspect of the present invention the voice quality enhancement (VQE) detector can adjust parameters of an adaptive voice quality enhancement device VED depending on the detection result. Accordingly, in this implementation the voice quality enhancement (VQE) detector performs a soft decision and controls a parameterization of the VQE processing performed by the voice quality enhancement device VED.

In a further possible implementation of the voice quality enhancement (VQE) detector according to the first aspect of the present invention said voice quality enhancement VQE detector controls to switch at least one voice quality enhancement VQE-function (VQEF) provided by said voice quality enhancement device VED on or off depending on the detection result. Accordingly, in this implementation the voice quality enhancement (VQE) detector performs a hard decision and activates or deactivates VQE-functions provided by the voice quality enhancement device VED according to the detection result.

In a further possible implementation of the voice quality enhancement (VQE) detector according to the first aspect of the present invention said voice quality enhancement detection is a closed loop voice quality enhancement detection and comprises: applying a voice quality enhancement function to said received audio signal by said voice quality enhancement device to obtain a processed version of the received audio signal; and detecting that at least one voice quality enhancement function, VQEF, or that at least said applied quality enhancement function was applied to the received audio signal by one of the previous network elements if an evaluation of a voice quality metric obtained for the received audio signal and a voice quality metric obtained for the processed version of the received audio signal fulfils a predetermined criterion.

Voice quality metrics are, for example, mean opinion scores (MOS) or subjective difference grade (SDG). The evaluation of the voice quality metrics may, for example, be performed by comparing the voice quality metric obtained for the received audio signal and the voice quality metric obtained for the processed version of the received audio signal but may also include more complex evaluations. The voice quality metric may directly provide the comparison between the received audio signal and the processed version of the received audio signal. In that case, a positive value may indicate that the processed version is better than the received audio signal and a negative value may indicate that the processed version is degraded.

In a still further possible implementation of the voice quality enhancement VQE detector according to the first aspect of the present invention the voice quality enhancement (VQE) detector performs a non-intrusive speech quality assessment of the received audio signal. Non-intrusive speech quality assessment techniques provide an estimation of the speech quality based solely on the received audio signal.

In a possible implementation of the VQE detector according to the first aspect of the present invention the VQE is run in a closed loop where MOS scores between the received audio signal and a VQE processed signal are compared. The detection is then based on the one which has the highest scores.

In a possible implementation of the voice quality enhancement (VQE) detector according to the first aspect of the present invention the voice quality enhancement (VQE) detector is adapted to detect a strength of a voice quality enhancement VQE-function (VQEF) applied to the received audio signal by one of the previous network elements or by said voice quality enhancement device VED and to adjust parameters of the adapted voice quality enhancement device VED, accordingly.

In a further possible implementation of the voice quality enhancement (VQE) detector according to the first aspect of the present invention the voice quality enhancement (VQE) detector is adapted to extract and analyze signal features from the received undecoded or decoded audio signal to perform said voice quality enhancement detection.

In a possible implementation of the voice quality enhancement (VQE) detector according to the first aspect of the present invention the signal features of the received audio signal extracted and analyzed by the voice quality enhancement (VQE) detector can comprise a spectral flatness measure and/or a spectral dynamic and/or a pitch period and/or a pitch gain and/or a speech variance of the received audio signal. Other signal features can be used as well.

In a possible implementation of the voice quality enhancement (VQE) detector according to the first aspect of the present invention the used statistical model is a Gaussian Mixture Model GMM.

In a further possible implementation of the voice quality enhancement VQE detector according to the first aspect of the present invention the detection result provided by the voice quality enhancement (VQE) detector is signaled to other network elements of said network. These network elements can comprise terminals and intermediate network nodes of the network. Furthermore, the detection result can be both signaled to other network elements within the same communication chain or to network elements not provided within the respective communication chain of the network. It is possible that a VQE detector in a first network element performs a VQE detection and controls a VED device in another network element accordingly.

According to a second aspect of the present invention the invention provides a network element of a wired and/or wireless communication network comprising a voice quality enhancement (VQE) detector according to the first aspect of the present invention and/or one of its implementations and at least one voice quality enhancement device (VED) for voice quality enhancement processing of the received audio signal controlled by said voice quality enhancement (VQE) detector.

In a possible implementation the voice quality enhancement (VQE) detector and the voice quality enhancement device (VED) of the network element form an integrated unit which can be hardware or software implemented.

In a possible implementation of the network element according to the second aspect of the present invention the network element is a user terminal. The network element can be formed in a possible implementation by a user equipment (UE) device or a mobile phone.

In a further possible implementation of the network element according to the second aspect of the present invention the network element can be a network node within a communication chain of an optical, electrical or electromagnetic communication network between user terminals. The network node can be for example an intermediate network node such as a gateway.

The invention further provides according to a third aspect a communication network comprising network elements according to the second aspect of the present invention. This communication network can be a wireless or wired communication network or a combination of wireless or wired communication sub-networks.

The invention further provides according to a forth aspect a method for controlling a voice quality enhancement (VQE) provided by a voice quality enhancement device (VED) of a network element receiving an audio signal from a network element of a communication network, the method comprising the following steps: performing a voice quality enhancement detection based on the received audio signal, wherein said voice quality enhancement detection comprises detecting that at least one voice quality enhancement function, VQEF, was applied to the received audio signal by one of the previous network elements; and controlling a voice quality enhancement processing of the received audio signal depending on the detection result.

In a possible implementation of the fourth aspect, said voice quality enhancement detection comprises detecting at least one specific voice quality enhancement function, VQEF, which was applied to the received audio signal by the at least one previous network element.

The explanations given with regard to the first aspect of the invention and its implementations apply correspondingly to the fourth aspect and its implementations.

BRIEF DESCRIPTION OF THE DRAWINGS

In the following possible implementations of different aspects of the present invention are described with reference to the enclosed figures.

DETAILED DESCRIPTION OF THE EMBODIMENTS

Figure 1:
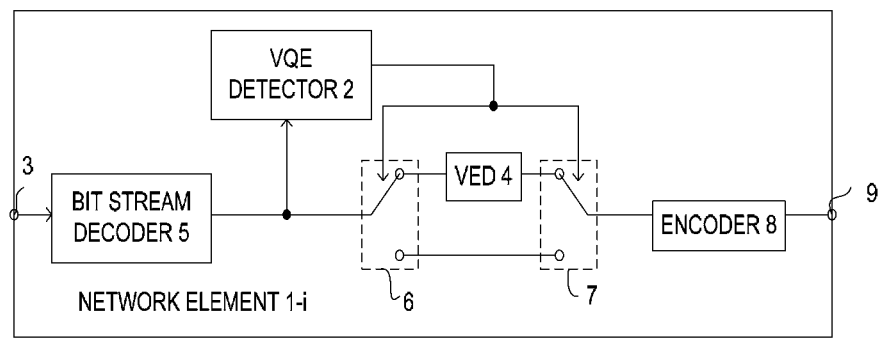
FIG. 1 shows a block diagram of a network element in a network comprising a voice quality enhancement (VQE) detector according to the first aspect of the present invention.

In the block diagram of FIG. 1 a network element 1 of a network is shown wherein the network element 1 comprises a voice quality enhancement (VQE) detector 2 according to a first aspect of the present invention. The network element 1-$i$ comprises a signal input 3 for receiving an audio signal from at least one previous network element 1-($i$−1). The previous network element 1-($i$−1) can be formed by previous network element within a communication chain in the network. The ordering of network elements is defined according to this invention to be consistent with the signal path, i.e. a previous network element of a network element will receive a signal, process it and transmit it to the network element. A network element, such as shown in FIG. 1 can be formed by terminals or intermediate network nodes. It can be seen in the implementation of FIG. 1 that the voice quality enhancement VQE detector 2 can be integrated in the network element 1-$i$ of the communication network. The voice quality enhancement (VQE) detector 2 is adapted to detect that at least one voice quality enhancement function (VQEF) was applied to the received audio signal by one of the previous network elements or to detect at least one specific voice quality enhancement function (VQEF) applied to the received audio signal by one of the previous network elements as shown in the implementation of FIG. 1. The voice quality enhancement VQE detector 2 is further adapted to control a voice quality enhancement device (VED) 4 of the respective network element 1. The voice quality enhancement device (VED) 4 is controlled depending on a detection result. In the shown implementation the detection result is used to control two switches 6, 7.

In the shown implementation of FIG. 1 the voice quality enhancement detector 2 operates in the signal domain, i.e. on the basis of a decoded audio signal generated by a bit stream decoder 5. The bit stream decoder 5 receives the bit stream or audio signal from previous network elements supplied to the input 3 of the network node 1 and decodes the received audio signal bit stream. In the implementation shown in FIG. 1 the voice quality enhancement detector 2 is connected to an output of the bit stream decoder 5 and processes the decoded signal generated by the bit stream decoder 5 to detect at least one voice quality enhancement function VQEF applied by one of the previous network elements to the received audio signal decoded by the bit stream decoder 5.

The detected voice quality enhancement function VQEF can be formed by one of different types of voice quality enhancement functions VQEFs, in particular a voice quality enhancement (VQE) noise reduction function and/or a voice quality enhancement (VQE) echo cancellation function. Further, the VQE-functions can comprise a dynamic range compression function and/or an automatic gain control function. The voice quality enhancement detector 2 can in a possible implementation be tuned or configured to detect at least one specific voice quality enhancement function, e.g., the voice quality enhancement detector 2 can be adapted to detect whether an echo cancellation function and/or whether a noise reduction function has been applied to the received audio signal by at least one of the previous network nodes. If a specific voice quality enhancement function VQEF such as noise reduction or acoustic echo cancellation is detected on the received audio signal by the voice quality enhancement detector 2 the detector controls the switches 6, 7 shown in FIG. 1 according to the detection result. If a specific voice quality enhancement function VQEF has been detected the voice quality enhancement (VQE) detector 2 controls the switches such that no voice quality enhancement function processing of the same VQE-function as detected is applied to the received signal in the current network element 1-$i$. For example, if a specific voice quality enhancement function (VQEF) is detected the corresponding voice enhancement device 4 provided within the network element 1-$i$ for this specific voice quality enhancement function VQEF can be bypassed by controlling the switches 6, 7 accordingly as illustrated in FIG. 1 so that no voice quality enhancement is performed on the received audio signal. In contrast, if the specific voice quality enhancement function VQEF is not detected by the voice quality enhancement detector 2 the switches 6, 7 are controlled such that the voice quality enhancement device 4 providing this specific voice quality enhancement function VQEF receives the decoded signal from the bit stream decoder 5 and outputs the voice quality enhanced signal to an encoder 8 as illustrated in FIG. 1. The encoder 8 outputs the final output bit stream at an output 9 of the network element 1-$i$. This output bit stream can be applied possibly to a further network element 1-($i$+1) within a communication chain of the network.

If a specific voice quality enhancement function VQEF is detected by the voice quality enhancement VQE detector 2 the received signal can still be processed with other voice quality enhancement function algorithms, for example by the VED 4 of the same network element or by a VED of a consecutive network element, targeting different functionalities for being transmitted to the next network element.

If in a received audio signal all predetermined voice quality enhancement functions (VQEFs) are detected to be already applied to the received signal no voice quality enhancement (VQE) is performed by a voice quality enhancement device (4) of the respective network element 1-$i$. Contrary, if no voice quality enhancement at all is detected in the received signal all voice quality enhancement VQE processing available in the network element 1-$i$ can be used to process the received audio signal. It can be seen in the block diagram of FIG. 1 that the voice quality enhancement (VQE) detector 2 of the network element 1-*i* does not use any control signal being carried over the network from other network elements but that it performs its own local detection whether a voice quality enhancement VQE has been applied and appropriately disables or enables corresponding voice quality enhancement VQE processing units or voice enhancement devices 4 within the network element 1-*i* depending on the detection results.

Figure 2:
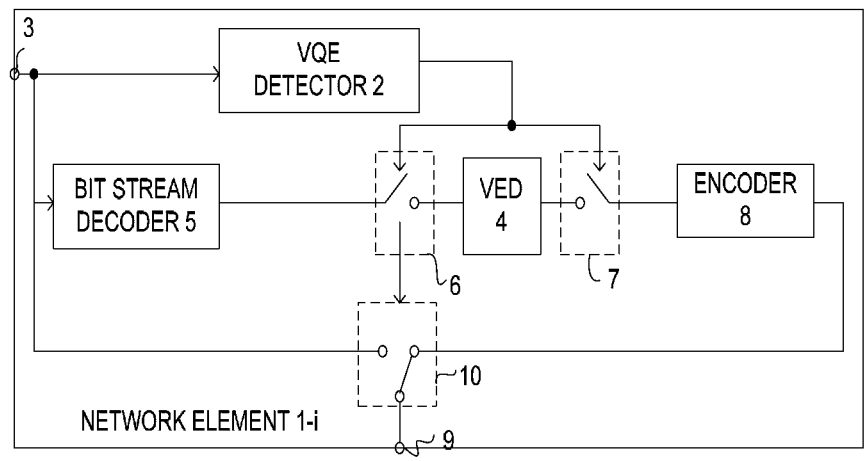
FIG. 2 shows a block diagram of a further possible implementation of a network element comprising a voice quality enhancement detector according to the first aspect of the present invention.

FIG. 2 shows a further possible implementation of a network element 1-*i* comprising a voice quality enhancement (VQE) detector 2 according to the first aspect of the present invention. In the shown implementation of voice quality enhancement the detection is not performed in a signal domain but directly in the encoded domain, i.e. in the received bit stream of the input encoded audio signal applied to the input 3 of the network element 1-*i*. In this implementation the voice quality enhancement detector 2 is connected to the signal input 3 and processes a bit stream of the audio signal received at the signal input 3 to detect at least one voice quality enhancement (VQE) function applied to the received audio signal by one of the previous network elements of the network. In case the result of the VQE detection is such that no VQE processing is required or to be performed, a switch 10 is used to disable the VQE at the current network element directly in the encoded domain, thus not requiring a step of encoding and decoding. In other words, in this case switch 10 bypasses the voice quality enhancement processing performed in the signal domain by the bitstream decoder 5, the voice quality enhancement device 4 and the encoder 8. It should be noted that for certain VED the VQE function can also be performed in the encoded signal domain. In this case, the bitstream decoder 5 and encoder 8 may not be needed since the voice quality enhancement will be performed directly in the encoded signal domain by the voice quality enhancement device 4 without prior decoding and subsequent re-encoding.

Figure 3:
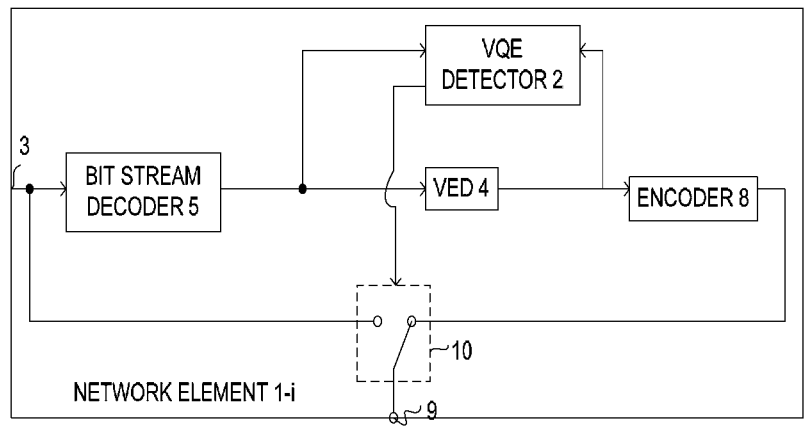
FIG. 3 shows a block diagram of a further possible implementation of a network element comprising a voice quality enhancement detector according to the first aspect of the present invention.

FIG. 3 shows a further possible implementation of a network element 1-*i* comprising a voice quality enhancement (VQE) detector 2 according to the first aspect of the present invention. The implementation of FIG. 3 comprises a voice quality enhancement (VQE) detector 2 being based on a non-intrusive speech quality assessment. The non-intrusive speech quality assessment technique used by the VQE detector 2 provides an estimation of a speech quality based solely on the received signal.

In a possible implementation the voice quality enhancement detector 2 is a closed loop voice quality enhancement detection and is adapted to apply a voice quality enhancement function to the received audio signal by the voice quality enhancement device to obtain a processed version of the received audio signal; and to detect that at least one voice quality enhancement function, VQEF, or that at least the applied quality enhancement function was applied to the received audio signal by one of the previous network elements if an evaluation of a voice quality metric obtained for the received audio signal and a voice quality metric obtained for the processed version of the received audio signal fulfils a predetermined criterion.

In a possible implementation the voice quality enhancement detector 2 can, for example, estimate a mean opinion score (MOS) degradation before and after a voice quality enhancement VQE provided by voice quality enhancement device 4 within the current network element 1-*i* is applied to the received audio signal using a non-intrusive speech quality assessment technology. In the shown exemplary implementation of the voice quality enhancement function (VQEF) provided by the voice quality enhancement VQE device 4 is not used if the estimated MOS value after performing of the voice quality enhancement function is degraded. This means that although the input signal has been enhanced for the sake of measuring the extent of the enhancement, the output signal corresponds to the input signal, i.e. the processed version of the audio signal provided by the VED 4 is not selected by switch 10 as output of the network element, and overall no enhancement of the input signal has been performed by the network element. The result of the comparison of the MOS values is an indication of the detection of VQE processing on the received audio signal since in most cases, if the estimated MOS score at the output of the VQE device 4 is lower than that of the input signal, then there is a strong indication that VQE has already been applied and therefore the VQE device is in this case not used. Accordingly, the voice quality enhancement (VQE) detector 2 compares in the shown implementation the decoded signal provided by the bit stream decoder 5 with the enhanced signal output by the voice quality enhancement device 4 to check whether the voice quality has been improved. If the MOS value after the voice quality enhancement VQE is degraded, or at least not improved by a predetermined extent, the voice quality enhancement function provided by the voice quality enhancement device (VED) 4 is not used by controlling the switch 10. Accordingly, the enhanced bit stream output by the encoder 8 is blocked and the received bit stream is directly output as a final output bit stream at the output 9 of the network element 1-*i*. In contrast, if the detected MOS value is improved, it is assumed that no or at least not that specific voice quality enhancement function was previously applied to the audio signal, and the voice quality enhancement function VQEF is applied by switching the output of the encoder 8 to the output 9 of the network element 1 so that the voice quality enhancement VQE is performed by the voice quality enhancement device 4 to the received audio signal.

The voice quality enhancement devices 4 shown in the different implementations of FIGS. 1, 2, 3 can be adaptive voice quality enhancement devices. In a possible implementation the voice quality enhancement VQE detector 2 can perform a soft decision by controlling a parameterization of the adaptive voice quality enhancement processing devices 4. The voice quality enhancement VQE detector 2 can adjust parameters of the adapted voice quality enhancement device 4 depending on the detection result. In a possible implementation the voice quality enhancement (VQE) detector 2 is adapted to detect a strength of a voice quality enhancement (VQE)-function applied to the received audio signal of one of the previous network elements or by the voice quality enhancement device 4 of the respective network element and to adjust parameters of the adapted voice quality enhancement device 4 depending on the detection result and detected strength of the voice quality enhancement (VQE)-function.

In a further possible alternative implementation the voice quality enhancement detector 2 can provide a hard decision and activate or deactivate corresponding voice quality enhancement functions VQEFs. In a possible implementation the voice quality enhancement (VQE) detector 2 switches at least one voice quality enhancement (VQE)-function provided by the voice quality enhancement device (VED) 4 of the network element 1-*i* on or off depending on the detection result. In the implementation forming a soft decision a voice quality enhancement detector 2 can detect a strength of a previous voice quality enhancement function VQEF. If the previously applied voice quality enhancement function VQEF is detected as a strong processing, for instance, a strong noise reduction with very limited residual background noise the voice quality enhancement detector 2 controls the voice quality enhancement device 4 such that no corresponding voice quality enhancement function is applied to the received audio signal in the current network element 1-*i*. If a previous voice quality enhancement processing is detected but the detected voice quality enhancement function VQEF is not strong, for instance, a noise reduction with a still high level of background noise, the voice quality enhancement detector 2 can control the voice quality enhancement device 4 to process the received audio signal further by adjusting the parameters of the voice quality enhancement VQE device 4 accordingly. If all voice quality enhancement functions VQEFs are detected by the voice quality enhancement VQE detector 2 in the received audio signal and if all detected voice quality enhancement functions VQEFs are detected to be strongly processed no voice quality enhancement function VQEF is applied to the received audio signal by a VQE device 4 of the current network element 1-*i*.

In a still further possible implementation the voice quality enhancement VQE detector 2 is adapted to extract and analyze signal features from the received audio signal to detect at least one voice quality enhancement (VQE)-function applied to the received audio signals by means of a statistical model. Typically, the statistical model may be built and trained on a large database consisting of several signals on which either a specific type of VQE has been applied or signal on which different types of VQE have been applied. In a possible implementation the extracted and analyzed signal features of the received audio signal can comprise a spectral flatness measure and/or a spectral dynamic and/or a pitch period and/or a pitch gain and/or a speech variance of the received audio signal. The distribution of the extracted and analysed features may be estimated and trained on large database of VQE processed signals. The employed statistical model can be formed by a Gaussian mixture model GMM. The mixture model can be a probabilistic model for density estimation using a mixture distribution. That is, the observations in a mixture model are assumed to be distributed according to a predetermined mixture density. The mixture model can be regarded as a type of unsupervised learning or clustering. This statistical modelling can also be based on statistical detection techniques such as the Bayesian detection or support vector machines.

Figure 4:
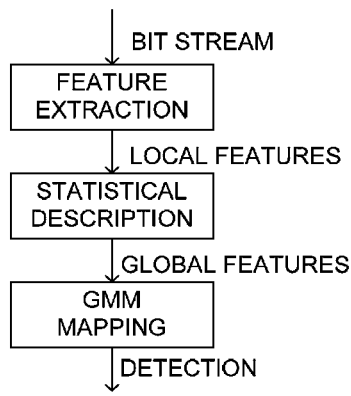
FIG. 4 shows a diagram for explaining a feature extraction and analysis as performed by a voice quality enhancement detector according to a further possible implementation of the first aspect of the present invention.

FIG. 4 illustrates a feature extraction and analyzing of signal features as performed by a voice quality enhancement detector 2 according to a possible implementation using a Gaussian mixture model GMM. From the received bit stream first local features are extracted from which global features are derived by means of a statistical description and the global features are then applied to a Gaussian mixture model GMM mapping for detecting the voice quality enhancement function applied to the received audio signal. The detection can be based on an analysis and feature extraction of the decoded signal or directly on the received bit stream or based on using MOS degradations. The application of voice quality enhancement VQE processing in the network element 1-*i* is conditional to a non-detection of a similar voice quality enhancement VQE processing in the received signal or a detected improvement of the signal quality by an integrated voice quality enhancement device 4. The voice quality enhancement VQE function detection can be global leading to a deactivation of all voice quality enhancement VQE functions or partial leading to a deactivation of at least one specific voice quality enhancement function in the current network element 1-*i* if this VQE function is detected in the received audio signal. The detection can be either a hard detection or a soft detection. In a soft detection, a strength of a previous VQE processing can be estimated and can together with the detection be used to adaptively parameterize the voice quality enhancement device 4 in the current network element 1-*i*.

The voice quality enhancement VQE detector 2 according to the first aspect of the present invention does not need any additional signalling. Accordingly, such signalling does not need to be standardized or implemented and therefore the voice quality enhancement VQE detector 2 according to the first aspect of the present invention is backward compatible to existing network deployments. The voice quality enhancement VQE detector 2 according to the first aspect of the present invention can be used to generate a signalling. It can be used, e.g., to employ signalling schemes as envisaged under ITU-T G.799.2. This is beneficial for legacy terminals and in general legacy voice quality enhancement VQE equipment which does not support signalling by the voice quality enhancement detector 2 according to the first aspect can trigger the signalling in the whole communication network.

Figure 5:
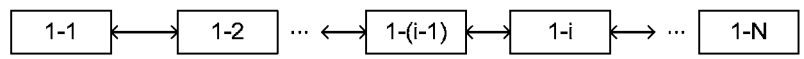
FIG. 5 shows a block diagram of a communication chain of network elements within a communication network according to a further aspect of the present invention.

FIG. 5 shows a block diagram of a communication chain within a communication network 1 consisting of network elements 1-*i*. The communication chain shown in FIG. 5 connects a first terminal 1-1 to a remote second terminal 1-N which are connected to each other by means of intermediate network nodes. In other words, in case an audio signal is sent from network element 1-1 as signal source to network element 1-N as signal sink, the network chain 1-1 to 1-N forms a network path describing the path of the audio signal through the network, wherein the network elements 1-1 to 1-(*i*−1) are previous network elements with regard to network element 1-*i*. According to a second aspect of the present invention at least one network element 1-*i* of a wired and/or wireless communication network is provided comprising at least one voice quality enhancement VQE detector 2 and at least one voice quality enhancement (VQE) device 4 controlled by the voice quality enhancement detector 2. This network element can either be a terminal, such as terminal 1-1, 1-N or an intermediate network node 1-*i* of the communication chain. The network elements can be connected by wireless or wired links. Further, the network can comprise an electrical or electromagnetic communication network or an optical communication network.

According to a further aspect of the present invention a method for controlling a voice quality enhancement VQE provided by a voice quality enhancement device 4 of a network element 1 receiving an audio signal from at least one previous network element of a communication network is provided, wherein at least one voice quality enhancement (VQE)-function applied to the received audio signal by one of the previous network elements or a signal quality enhancement being caused by at least one voice quality enhancement VQE function applied to the received audio signal by the voice quality enhancement device 4 of the respective network element 1 is detected and the voice quality enhancement VQE device 4 of the respective network element 1 is controlled depending on the detection result. The method according to the forth aspect of the present invention can be performed by a control program executed by an execution unit of the voice quality enhancement (VQE) detector 2. The present invention provides a voice quality enhancement VQE detection by at least one network element of the communication chain within a network wherein this detection can be based on analysis and feature extraction of the decoded signal or directly on the received bit stream or based on using MOS degradations. The application of the voice quality enhancement VQE processing in the current network element can be conditional to a non-detection of a similar voice quality enhancement VQE processing or function on the received audio signal or conditional on the improvement of the signal quality caused by the voice quality enhancement device 4 integrated in the same network element. Furthermore, the detection can be global leading to a deactivation of all voice quality enhancement functions VQEFs within the current network element or partial causing a deactivation of at least specific voice quality enhancement functions VQEF in the current network element if a corresponding voice quality enhancement VQE has been detected in the received audio signal.

The detection can be either a soft detection or a hard detection. In a soft detection the strength of the previous processing can be estimated together with the detection and be used to adaptively parameterize the voice quality enhancement function VQEF in the current network element. The method according to the present invention does not need any additional signalling to be standardized or implemented and it is backward compatible to existing network deployments.

The method according to the fourth aspect of the present invention avoids speech degradations and improves speech quality. It avoids a speech or signal degradation which can occur when voice quality enhancement processing is applied twice or more in a communication chain of a network. The method is efficient for each network element of a communication chain as soon as it is introduced in the network.

What is claimed is:

1. A voice quality enhancement (VQE) detector device for a network element receiving an audio signal from a previous network element of a network,
   wherein the VQE detector device is configured to:
   perform a VQE detection based on the received audio signal, wherein the VOE detection comprises:
   extracting and analyzing signal features from the received audio signal based on a statistical model, to detect that at least one voice quality enhancement function (VQEF) has been applied to the received audio signal by at least one previous network element of the network, wherein the statistical model is built on a database consisting of signals on which at least one type of VQE has been applied; and
   control a VQE processing of the received audio signal according to a detection result;
   wherein the VQEF comprises a noise reduction or an echo cancellation function;
   and the statistical model is formed by a Gaussian Mixture Model GMM.

2. The VQE detector device according to claim 1,
   wherein the at least one VQEF is at least one of the following: a noise reduction function, an echo cancellation function, a dynamic range compression function, and an automatic gain control function.

3. The VQE detector device according to claim 2,
   wherein the VQE detector device is configured to extract and analyze signal features from the received audio signal to perform the voice quality enhancement detection, wherein the received audio signal is coded or non-coded.

4. The VQE detector device according to claim 3,
   wherein the signal extracted and analyzed features of the received audio signal comprise at least one of the following features:
   a spectral flatness measure,
   a spectral dynamic,
   a pitch period,
   a pitch gain, and
   a speech variance of the received audio signal.

5. The VQE detector device according to claim 4,
   wherein the VQE detector device is configured to detect a strength of a VQEF applied to the received audio signal by the at least one of the previous network element.

6. The VQE detector device according to claim 4,
   wherein the detection result provided by the VQE detector device is signaled to at least one other network element of the network.

7. The VQE detector device according to claim 2,
   wherein said received audio signal is a coded audio signal; and
   wherein said VQE detector device is connected to a signal input and processes a bit stream of the coded audio signal received at the signal input to perform said voice quality enhancement detection; or
   wherein said VQE detector device is connected to an output of a bit stream decoder and processes a decoded signal generated by said bit stream de-coder based on the received coded audio signal to perform said voice quality enhancement detection.

8. The VQE detector device according to claim 1, wherein the voice quality enhancement detection is a closed loop voice quality enhancement detection and comprises:
   applying a VQEF to the received audio signal by a VQE device to obtain a processed version of the received audio signal; and
   detecting that the at least one VQEF or at least the applied VQEF has been applied to the received audio signal by one of the previous network elements, if an evaluation of a voice quality metric obtained for the received audio signal and a voice quality metric obtained for the processed version of the received audio signal fulfills a predetermined criterion.

9. The VQE detector device according to claim 8,
   wherein the VQE is applied in a closed loop where mean opinion scores between the received audio signal and a VQE processed signal are compared.

10. The VQE detector device according to claim 1,
    wherein the VQE detector device is configured to extract and analyze signal features from the received audio signal to perform the voice quality enhancement detection, wherein the received audio signal is coded or non-coded.

11. The VQE detector device according to claim 10,
    wherein the signal extracted and analyzed features of the received audio signal comprise at least one of the following features:
    a spectral flatness measure,
    a spectral dynamic,
    a pitch period,
    a pitch gain, and
    a speech variance of the received audio signal.

12. The VQE detector device according to claim 1,
    wherein received audio signal is a coded audio signal; and
    wherein the VQE detector device is connected to one of a signal input and an output of a bit stream decoder;
    when the VQE detector device is connected to the signal input, the VQE detector device processes a bit stream of the coded audio signal received at the signal input to perform the voice quality enhancement detection; and
    when the VQE detector device is connected to the output of the bit stream decoder, and the VQE detector device processes a decoded signal generated by the bit stream de-coder based on the received coded audio signal to perform the voice quality enhancement detection.

13. The VQE detector device according to claim 1,
    wherein said voice quality enhancement processing is an adaptive voice quality enhancement processing and said VQE detector device adjusts parameters of said adaptive voice quality enhancement processing depending on the detection result.

14. The VQE detector device according to claim 1, wherein the VQE detector device controls to switch the at least one VQEF provided by the voice quality enhancement processing on or off according to the detection result.

15. The VQE detector device according to claim 1, wherein the VQE detector device comprises a non-intrusive speech quality assessment of the received audio signal.

16. The VQE detector device according to claim 1, wherein the VQE detector device is configured to detect a strength of a VQEF applied to the received audio signal by the at least one previous network element.

17. The VQE detector device according to claim 1, wherein the detection result provided by the VQE detector device is signaled to at least one other network element of the network.

18. A network element of a wired and/or wireless communication network comprising
a voice quality enhancement (VQE) detector for the network element receiving an audio signal from a previous network element of the network;
at least one VQE device for the VQE processing of the received audio signal controlled by the VQE detector;
wherein the VQE detector is configured to:
perform a VQE detection based on the received audio signal, wherein the VOE detection comprises:
extracting and analyzing signal features from the received audio signal based on a statistical model, to detect that at least one voice quality enhancement function (VQEF) has been applied to the received audio signal by at least one previous network element of the network, wherein the statistical model is built on a database consisting of signals on which at least one type of VQE has been applied;
and control a VQE processing of the received audio signal according to a detection result;
wherein the VQEF comprises of a noise reduction or an echo cancellation function;
and the statistical model is formed by a Gaussian Mixture Model GMM.

19. The network element according to claim 18, comprising:
a user terminal or a network node within a communication chain of an optical, electrical, electromagnetic wired or wireless communication network between user terminals.

20. A method for controlling a voice quality enhancement (VQE) provided by a VQE device of a network element receiving an audio signal from a previous network element of a communication network, comprising:
performing, in a VQE detector device, a VQE detection based on the received audio signal, wherein the voice quality enhancement detection comprises:
extracting and analyzing signal features from the received audio signal based on a statistical model, to detect that at least one voice quality enhancement function (VQEF) has been applied to the received audio signal by the previous network element, wherein the statistical model is built on a database consisting of signals on which at least one type of VQE has been applied; and
controlling, by the VQE detector device, a VQE processing of the received audio signal according to a detection result;
wherein the VQEF comprises a noise reduction or an echo cancellation function;
and the statistical model is formed by a Gaussian Mixture Model GMM.

* * * * *

UNITED STATES PATENT AND TRADEMARK OFFICE
CERTIFICATE OF CORRECTION

| | |
|---|---|
| PATENT NO. | : 9,299,359 B2 |
| APPLICATION NO. | : 13/940494 |
| DATED | : March 29, 2016 |
| INVENTOR(S) | : Taleb et al. |

It is certified that error appears in the above-identified patent and that said Letters Patent is hereby corrected as shown below:

Claims

Column 13, line 33, claim 1, "VOE" should read -- VQE --.

Column 14, line 4, claim 5, "one of the previous network element" should read -- one previous network element --.

Column 15, line 31, claim 18, "VOE" should read -- VQE --.

Signed and Sealed this
Seventh Day of June, 2016

Michelle K. Lee
*Director of the United States Patent and Trademark Office*